(12) United States Patent
Liu et al.

(10) Patent No.: US 12,428,091 B2
(45) Date of Patent: Sep. 30, 2025

(54) EARLY-WARNING SYSTEM, METHOD AND DEVICE FOR STEERING OF TWO-WHEELED VEHICLE, AND CORRESPONDING TWO-WHEELED VEHICLE

(71) Applicant: SHARKGULF TECHNOLOGY (QINGDAO) CO., LTD., Qingdao (CN)

(72) Inventors: Ke Liu, Shanghai (CN); Hui Hu, Shanghai (CN); Shiyao Liu, Shanghai (CN); Peng Li, Shanghai (CN)

(73) Assignee: SHARKGULF TECHNOLOGY (QINGDAO) CO., LTD., Qingdao (CN)

( * ) Notice: Subject to any disclaimer, the term of this patent is extended or adjusted under 35 U.S.C. 154(b) by 116 days.

(21) Appl. No.: 17/907,797

(22) PCT Filed: Jan. 10, 2021

(86) PCT No.: PCT/CN2021/071002
§ 371 (c)(1),
(2) Date: Aug. 29, 2022

(87) PCT Pub. No.: WO2021/169629
PCT Pub. Date: Sep. 2, 2021

(65) Prior Publication Data
US 2023/0102579 A1    Mar. 30, 2023

(30) Foreign Application Priority Data

Feb. 28, 2020 (CN) .......................... 202010127193.2

(51) Int. Cl.
*B62J 50/22* (2020.01)
*A42B 3/04* (2006.01)
(Continued)

(52) U.S. Cl.
CPC .............. *B62J 50/22* (2020.02); *A42B 3/044* (2013.01); *A42B 3/30* (2013.01); *B60W 50/14* (2013.01);
(Continued)

(58) Field of Classification Search
CPC ........... B62J 50/22; A42B 3/044; A42B 3/30; B60W 50/14; B60W 2420/408;
(Continued)

(56) References Cited

U.S. PATENT DOCUMENTS 7,522,041 B1 * 4/2009 Parish ................. G01N 21/7703
340/540
2003/0137413 A1 * 7/2003 Morse .................. B60Q 1/2676
340/468
(Continued)

FOREIGN PATENT DOCUMENTS

| CN | 106663378 A | 5/2017 |
|---|---|---|
| CN | 206938977 U | 1/2018 |

(Continued)

OTHER PUBLICATIONS

International Search Report (with English Translation) and Written Opinion (with Machine Translation) issued on Apr. 2, 2021 in corresponding International Patent Application No. PCT/CN2021/071002.

*Primary Examiner* — Naomi J Small

(57) ABSTRACT

An early-warning system, method, and apparatus for steering of a two-wheeled vehicle, and a corresponding two-wheeled vehicle including a display apparatus. The system includes: a first control system and a second control system both operating independently and exchanging data between each other in real time; the first control system is configured to: monitor a steering state of the two-wheeled vehicle in real time and generate steering state data; generate early-warning state data based on the steering state data; transmit (Continued)

at least part of the steering state data and the early-warning state data to the second control system in real time; and control corresponding components of the two-wheeled vehicle to operate according to control instructions received from the second control system and internal preset instructions; and the second control system is configured to: control a display of the display apparatus based on the steering state data and/or the early-warning information.

13 Claims, 4 Drawing Sheets

(51) Int. Cl.
*A42B 3/30* (2006.01)
*B60W 50/14* (2020.01)

(52) U.S. Cl.
CPC . *B60W 2050/143* (2013.01); *B60W 2050/146* (2013.01); *B60W 2300/36* (2013.01); *B60W 2420/403* (2013.01); *B60W 2420/408* (2024.01)

(58) Field of Classification Search
CPC ..... B60W 2050/143; B60W 2050/146; B60W 2300/36; B60W 2420/403
USPC ...................................................... 340/425.5
See application file for complete search history.

(56) References Cited

U.S. PATENT DOCUMENTS

| | | | |
|---|---|---|---|
| 2007/0182532 A1* | 8/2007 | Lengning | G10H 1/0041 340/439 |
| 2009/0180278 A1* | 7/2009 | Cheng | A42B 3/044 362/106 |
| 2011/0304478 A1 | 12/2011 | Lee | |
| 2015/0160653 A1* | 6/2015 | Cheatham, III | G05D 1/0088 701/23 |
| 2017/0166112 A1* | 6/2017 | Lee | B60Q 1/343 |
| 2019/0098953 A1* | 4/2019 | Strickland | G06V 20/58 |
| 2019/0111940 A1* | 4/2019 | Kinuhata | G01C 21/26 |
| 2019/0366924 A1* | 12/2019 | Yoshihara | B60W 50/0097 |
| 2020/0145815 A1* | 5/2020 | Taylor | B60R 16/0231 |
| 2020/0407001 A1* | 12/2020 | Tetsuka | B62J 50/22 |
| 2024/0092390 A1* | 3/2024 | Philion | G06N 3/006 |

FOREIGN PATENT DOCUMENTS

| | | |
|---|---|---|
| CN | 109677410 A | 4/2019 |
| CN | 111176109 A | 5/2020 |
| CN | 111301573 A | 6/2020 |
| CN | 111312262 A | 6/2020 |
| CN | 111343603 A | 6/2020 |
| CN | 111371875 A | 7/2020 |
| JP | 2019125153 A | 7/2019 |
| TW | 201812719 A | 4/2018 |

* cited by examiner

EARLY-WARNING SYSTEM, METHOD AND DEVICE FOR STEERING OF TWO-WHEELED VEHICLE, AND CORRESPONDING TWO-WHEELED VEHICLE

The present application claims priority to Chinese Patent Application No. 202010127193.2, filed on Feb. 28, 2020 and entitled "EARLY-WARNING SYSTEM, METHOD, AND APPARATUS FOR STEERING OF TWO-WHEELED VEHICLE, AND CORRESPONDING TWO-WHEELED VEHICLE", which is hereby incorporated for reference in its entirety.

TECHNICAL FIELD

The present application relates to the field of driver assistance technologies, and in particular to an early-warning system, method, and apparatus for steering of a two-wheeled vehicle, and a corresponding two-wheeled vehicle.

BACKGROUND

With the development of technology, electric vehicles are used among an increasing number of people and gradually become a better means of transportation. However, safety becomes an important issue due to the fast speed of such a means of transportation, and people thus wear helmets for protection when driving.

When wearing a helmet, a user has a narrower field of view, and cannot see the surrounding road conditions in a short time when steering, which easily causes traffic accidents. Therefore, it is necessary for the electric vehicle to transmit early-warning information to the user according to the surrounding road conditions in time to ensure that the user steers safely.

SUMMARY

In order to solve the technical problem that safe steering cannot be ensured in a case that a user who drives a two-wheeled vehicle wearing a helmet has a narrow field of view when steering, the present application provides an early-warning system, method, and apparatus for steering of a two-wheeled vehicle, and a corresponding two-wheeled vehicle.

A first aspect of the present application provides an early-warning system for steering of a two-wheeled vehicle, the two-wheeled vehicle comprising a display apparatus. The early-warning system includes: a first control system and a second control system both operating independently and capable of exchanging data between each other in real time; where the first control system is configured to: monitor a steering state of the two-wheeled vehicle in real time and generate steering state data; generate early-warning state data based on the steering state data; transmit at least part of the steering state data and the early-warning state data to the second control system in real time; and control corresponding components of the two-wheeled vehicle to operate according to control instructions received from the second control system and internal preset instructions; and the second control system is configured to: receive the steering state data and the early-warning state data transmitted by the first control system; generate early-warning information based on the early-warning state data, and control a display of the display apparatus based on the steering state data and/or the early-warning information.

In a preferred embodiment of the present application, the second control system is further configured to transmit at least one of the steering state data, the early-warning state data, and the early-warning information to a mobile terminal and/or a cloud server connected to the second control system.

In a preferred embodiment of the present application, the first control system is connected to a steering switch on the two-wheeled vehicle and a turn signal provided on the two-wheeled vehicle, to control the turn signal to light up when a user turns on the steering switch.

In a preferred embodiment of the present application, the second control system includes a capturing apparatus for acquiring image information behind the two-wheeled vehicle and transmits the image information to the display apparatus.

In a preferred embodiment of the present application, the first control system includes a radar for acquiring radar wave signals behind the two-wheeled vehicle, and generates the early-warning state data based on the radar wave signals.

In a preferred embodiment of the present application, the early-warning information includes early-warning levels, and the second control system controls the display of the display apparatus according to the early-warning levels.

In a preferred embodiment of the present application, the two-wheeled vehicle further includes an audio playback apparatus; the second control system generates different early-warning audio according to the early-warning levels and transmits the early-warning audio to the audio playback apparatus.

In a preferred embodiment of the present application, the early-warning system further includes a helmet, and the second control system is further configured to transmit the early-warning information to the helmet connected to the two-wheeled vehicle.

In a preferred embodiment of the present application, the helmet includes at least one of a display unit, an audio playback unit and a light unit, and controls the display unit, the audio playback unit or the light unit to operate according to the early-warning information.

In a preferred embodiment of the present application, the light unit includes a plurality of lights presenting at least two colors, each of the at least two colors corresponds to an early-warning level, and the helmet controls a corresponding light to operate according to the early-warning level.

A second aspect of the present application provides an early-warning method for steering of a two-wheeled vehicle, including: monitoring a steering state of the two-wheeled vehicle in real time and generating steering state data; generating early-warning state data based on the steering state data; and generating early-warning information based on the early-warning state data and presenting the steering state data and/or the early-warning information to a user.

In a preferred embodiment of the present application, the method further includes: transmitting at least one of the steering state data, the early-warning state data, and the early-warning information to a mobile terminal and/or a cloud server connected to the second control system.

In a preferred embodiment of the present application, after the operation of monitoring a steering state of the two-wheeled vehicle in real time and generating steering state data, the method further includes:
  monitoring, when a user turns on the steering switch on the two-wheeled vehicle, a steering state of the two-wheeled vehicle in real time and generating steering instructions; and turning on a turn signal provided on the two-wheeled vehicle according to the steering instructions.

In a preferred embodiment of the present application, the operation of generating early-warning state data based on the steering state data, further includes:
acquiring image information within a preset range behind the two-wheeled vehicle;
acquiring radar wave signals behind the two-wheeled vehicle.

In a preferred embodiment of the present application, the operation of turning on a turn signal provided on the two-wheeled vehicle according to the steering instructions, further includes:
generating the early-warning information based on the image information and the radar wave signals, the early-warning information including an early warning level; and
presenting the early-warning information and the early-warning level to the user.

In a preferred embodiment of the present application, the method further includes: generating different early-warning audio depending on the early-warning levels.

In a preferred embodiment of the present application, the method further includes: transmitting the early-warning information to the helmet connected to the two-wheeled vehicle.

In a preferred embodiment of the present application, the operation of displaying the early-warning information and the early-warning level for the user, further includes:
displaying text warning messages on a display provided on the two-wheeled vehicle;
controlling flashing of a light provided on an edge of the helmet; and
controlling the helmet to play a voice early-warning message.

In a preferred embodiment of the present application, the operation of controlling flashing of a light provided on an edge of the helmet, further includes:
setting the light to present at least two colors, each of at least two colors corresponding to an early-warning level, and controlling the light to operate according to the early-warning level.

In a preferred embodiment of the present application, the operation of controlling the helmet to play a voice warning message, further includes:
controlling the helmet to play the voice early-warning message corresponding to a current early-warning level in a case of determining a current early-warning level.

A third aspect of the present application provides an early-warning apparatus for steering of a two-wheeled vehicle, including:
a steering state monitoring module for monitoring a steering state of the two-wheeled vehicle in real time and generating steering state data;
an early-warning state determination module for generating early-warning state data based on the steering state data;
an early-warning information generation module for generating early-warning information based on the early-warning state data; and
a presentation module for presenting the steering state data and/or the early-warning information to a user.

In a preferred embodiment of the present application, the apparatus further includes:
an information transmission module for transmitting at least one of the steering state data, the early-warning state data, and the early-warning information to a mobile terminal and/or a cloud server connected to the second control system.

In a preferred embodiment of the present application, the steering state monitoring module includes:
a controlling unit for monitoring, when a user turns on the steering switch provided on the two-wheeled vehicle, a steering state of the two-vehicle to generate steering instructions, and turning on a turn signal provided on the two-wheeled vehicle according to the steering instructions.

In a preferred embodiment of the present application, the early-warning determination module further includes:
a radar unit for acquiring radar wave signals behind the two-wheeled vehicle; and
an image acquisition unit for acquiring image information within a preset range behind the two-wheeled vehicle.

In a preferred embodiment of the present application, the early-warning generation module is further configured to generate the early-warning information based on the image information and the radar wave signals, the early-warning information including an early warning level.

In a preferred embodiment of the present application, the early-warning information generation module is further configured to generate different early-warning audio depending on the early-warning levels.

In a preferred embodiment of the present application, the information transmission module is configured to transmit the early-warning information to the helmet connected to the two-wheeled vehicle.

In a preferred embodiment of the present application, the presentation module further includes:
a text presentation unit for displaying text warning messages on a display provided on the two-wheeled vehicle;
a light presentation unit for controlling flashing of a light provided on an edge of the helmet; and
a voice playback unit for controlling the helmet to play a voice early-warning message.

In a preferred embodiment of the present application, the light display unit is further configured to set the light to present at least two colors, each of at least two colors corresponding to an early-warning level, and control the light to operate according to the early-warning level.

In a preferred embodiment of the present application, the voice playback unit is further configured to control the helmet to play the voice early-warning message corresponding to a current early-warning level.

A fourth aspect of the present application provides a two-wheeled vehicle, including a vehicle body and an early-warning system for steering, the vehicle body including a display apparatus, the early-warning system for steering including a first control system and a second control system both operating independently and capable of exchanging data between each other in real time;
the first control system is configured to:
monitor a steering state of the two-wheeled vehicle in real time and generate steering state data;
generate early-warning state data based on the steering state data;
transmit at least part of the steering state data and the early-warning state data to the second control system in real time; and
control corresponding components of the two-wheeled vehicle to operate according to control instructions received from the second control system and internal preset instructions; and the second control system is configured to:
  receive the steering state data and the early-warning state data transmitted by the first control system;
  generate early-warning information based on the early-warning state data, and control a display of the display apparatus based on the steering state data and/or the early-warning information.

In a preferred embodiment of the present application, the second control system is further configured to transmit at least one of the steering state data, the early-warning state data, and the early-warning information to a mobile terminal and/or a cloud server connected to the second control system.

In a preferred embodiment of the present application, the first control system is connected to a steering switch on the two-wheeled vehicle and a turn signal provided on the two-wheeled vehicle, to control the turn signal to light up when a user turns on the steering switch.

In a preferred embodiment of the present application, the second control system includes a capturing apparatus for acquiring image information behind the two-wheeled vehicle and transmits the image information to the display apparatus.

In a preferred embodiment of the present application, the first control system includes a radar for acquiring radar wave signals behind the two-wheeled vehicle, and generates the early-warning state data based on the radar wave signals.

In a preferred embodiment of the present application, the early-warning information includes early-warning levels, and the second control system controls the display of the display apparatus according to the early-warning levels.

In a preferred embodiment of the present application, the two-wheeled vehicle further includes an audio playback apparatus; and
  the second control system generates different early-warning audio depending on the early-warning levels and transmits the early-warning audio to the audio playback apparatus.

In a preferred embodiment of the present application, the early-warning system further includes a helmet, and the second control system is further configured to transmit the early-warning information to the helmet connected to the two-wheeled vehicle.

In a preferred embodiment of the present application, the helmet includes at least one of a display unit, an audio playback unit and a light unit, and controls the display unit, the audio playback unit or the light unit to operate according to the early-warning information.

In a preferred embodiment of the present application, the light unit includes a plurality of lights presenting at least two colors, each of the at least two colors corresponds to an early-warning level, and the helmet controls a corresponding light to operate according to the early-warning level.

A fifth aspect of the present application provides a helmet, including a shell and a communication device provided within the shell, where the communication device is connected to a two-wheeled vehicle for receiving early-warning information transmitted by the two-wheeled vehicle and presenting the early-warning information to a user.

A sixth aspect of the present application provides an electronic device, including a processor and a memory storing a computer executable program, where the processor executes a method as mentioned above when the computer program is executed by the processor.

A seventh aspect of the present application provides a computer-readable storage medium storing one or more programs, where the one or more programs, when executed by the processor, execute the method as mentioned above.

The technical solution of the present application has the following beneficial effects:

In the early-warning system for steering of a two-wheeled vehicle of the present application, during steering of the two-wheeled vehicle, steering detection is started, the surrounding images and radar signals during steering are transmitted to the central control display, and corresponding early-warning information is generated based on the obtained images and radar signals to accurately give the driver a safe operation prompt for clearly understanding whether there are two-wheeled vehicles or pedestrians nearby when steering. In this way, safety hazards are eliminated and traffic accidents are prevented to improve the driving safety of users and enhance the user experience.

BRIEF DESCRIPTION OF THE DRAWINGS

In order to make the technical problem solved, the technical means used and the technical effect achieved by the present application clearer, specific embodiments of the present application will be described in detail below with reference to the drawings. However, it should be declared that the drawings described below are only for example embodiments of the present application, and other embodiments of the drawings can be obtained for those skilled in the art according to these drawings without creative labor.

DETAILED DESCRIPTION OF THE EMBODIMENTS

Figure 1:
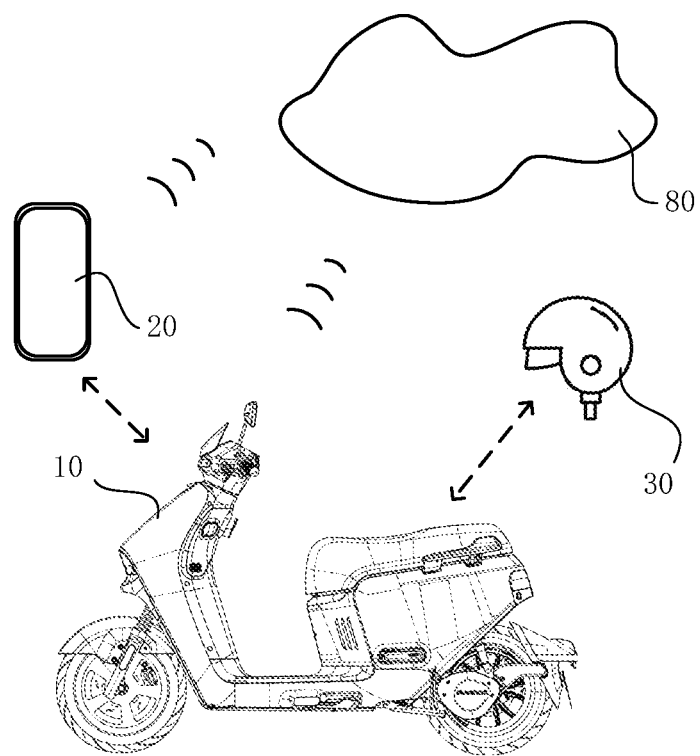
FIG. 1 is a schematic diagram of an application scenario of an early-warning system for steering of a two-wheeled vehicle according to an embodiment of the present application.

In the description of specific embodiments, the details of the structure, performance, effect or other features are described to allow those skilled in the art to fully understand the embodiments. However, it is not excluded that those skilled in the art may implement the present application in a particular case with a technical solution that does not contain the structure, performance, effect, or other features described above.

The flowchart in the drawings is only an example process demonstration and does not mean that all of the contents, operations and steps in the flowchart must be included in the embodiment of the present application, nor that they must be performed in the order shown in the drawings. For example, some operations/steps in the flowchart may be split, some operations/steps may be combined or partially combined, and so on, and the order of execution shown in the flowchart may be changed to suit the actual situation without departing from the inventive essence of the present application.

The block diagram in the drawings generally represents a functional entity and does not necessarily correspond to a physically separate entity. That is, the functional entity may be implemented by software, or in one or more hardware modules or integrated circuits, or in different network and/or processing unit apparatuses and/or microcontroller apparatuses.

The same reference numeral in the drawings denotes the same or similar elements, components, or parts, and thus repetitive descriptions of the same or similar elements, components, or parts may be omitted below. It should also be understood that while the attribute such as first, second, third, etc. representing number may be used herein to describe various devices, elements, components, or parts, these devices, elements, components, or parts should not be limited by such attributes. That is, these attributes are only used to distinguish one from another. For example, a first device may also be referred to as a second device, without departing from the substantial technical solution of the present application. In addition, the terms "and/or" refer to all combinations including any one or more of the listed items.

The present application proposes an early-warning system, method, and apparatus for steering of a two-wheeled vehicle, and a corresponding two-wheeled vehicle and helmet. In general, the system includes a two-wheeled vehicle, a mobile terminal and a helmet worn by a user, among which information can be exchanged. The two-wheeled vehicle can be any two-wheeled vehicles, including a bicycle, an electric bicycle, a motorcycle, an electric motorcycle, an electric scooter, etc. The mobile terminal can be a mobile phone, a pad, a smart watch, etc.

In order to solve the technical problem in the prior art that safe steering cannot be ensured in a case that a user who drives a two-wheeled vehicle wearing a helmet has a narrow field of view when steering, the two-wheeled vehicle of the present application adopts an early-warning system for steering, to monitor a steering state of the two-wheeled vehicle in real time, acquire environmental information surrounding the two-wheeled vehicle to confirm whether the steering is safe, and to provide the user with corresponding early-warning information to improve the user's driving safety and enhance the user experience.

In order to make the objects, technical solutions, and advantages of the present application more clearly understood, the present application is described below in further detail with reference to specific embodiments and the drawings.

FIG. 1 is a schematic diagram of an application scenario of an early-warning system for steering according to an embodiment of the present application.

As shown in FIG. 1, in this example application scenario, the early-warning system for steering is provided within a control system of a two-wheeled vehicle 10, and can exchange data with a mobile terminal 20 via a wired or wireless network. The wireless network can be Bluetooth, mobile hotspot, etc. The two-wheeled vehicle 10 communicates with a smart helmet 30 via the early-warning system for steering. In addition, both the two-wheeled vehicle 10 and a mobile terminal 20 can exchange data with a cloud server 80 over a mobile communication network. Users can not only directly operate the two-wheeled vehicle 10, but also use the mobile terminal 20 to remotely monitor and control the two-wheeled vehicle 10 to realize various intelligent application functions. In addition, the two-wheeled vehicle 10 is provided with a touch display (not shown in FIG. 1), and users can operate on the display to control the two-wheeled vehicle 10 for corresponding actions.

Figure 2:
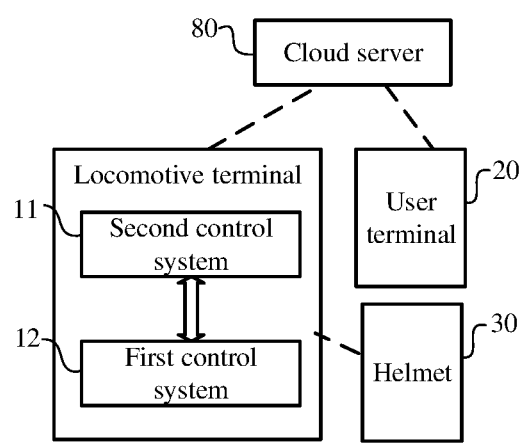
FIG. 2 is a diagram of an overall architecture of an early-warning system for steering of a two-wheeled vehicle according to an embodiment of the present application.

FIG. 2 is a diagram of an overall architecture of an intelligent control system for a two-wheeled vehicle according to an embodiment of the present application. As shown in FIG. 2, the mobile terminal 20 can also exchange information with the cloud server 80, and the cloud server 80 can also transmit a control instruction from the mobile terminal 20 to a second control system 11. The second control system 11 can receive the control instruction from the mobile terminal 20, and transmit the control instruction that needs to be processed by a first control system 12 to a first control system 12 for achieving applications in remote control, such as remote locking for anti-theft, etc.

The second control system 11 can also transmit operation state data of the two-wheeled vehicle, including various operation state data of the two-wheeled vehicle, from the first control system 12 to the cloud server 80. It should be noted that the operation state here includes an environmental state of the two-wheeled vehicle, a state of the whole vehicle, a state of each component of the two-wheeled vehicle, a state of the two-wheeled vehicle when driving, and a state of the two-wheeled vehicle in various modes such as shutdown without starting, starting without driving, etc. The cloud server 80 regularly detects the state data to determine whether the operation state of the two-wheeled vehicle is normal to prevent the user from danger during driving. A circuit failure of the two-wheeled vehicle 10 during charging easily causes fire, and the cloud server 80 will transmit a message to the user terminal 20 in time when detecting the charging abnormality, so that the user can understand the situation and deal with it in time even if the user is not next to the two-wheeled vehicle 10.

When the user needs to steer during driving the two-wheeled vehicle 10, an imaging system will be turned on to acquire the surrounding driving environment and determine whether there are other two-wheeled vehicles or pedestrians within a safe steering distance. If there are safety hazards, an early-warning system for steering of the two-wheeled vehicle will issue an early warning to prompt the user to wait for a steering chance and other operations, to ensure that the user safely drives the two-wheeled vehicle.

As shown in FIG. 2, the two-wheeled vehicle end includes the first control system 12 and the second control system 11 both constituting a dual independent control system. The control system can be implemented by an electronic control unit (ECU), also known as a "vehicle computer", which includes a microprocessor (CPU), a memory (a ROM and a RAM), an input/output interface (I/O), an analog-to-digital converter (A/D), and a large-scale integrated circuit such as shaping and driving. However, the present application does not exclude other forms of electronic control units, as long as they have certain data storage and processing capabilities.

The dual independent control system means that the first control system 12 and the second control system 11 can operate independently of each other. The independent operation in the present application means that the normal operations of basic operation modes of the first control system 12 do not depend on those of the second control system 11. Specifically, the basic locomotive control of the first control system 12 will not be affected when the second control system 11 is not operating normally, except that the first control system 12 cannot obtain a control instruction from the second control system 11 or transmit the operation state data of the two-wheeled vehicle to the second control system 11 in real time, but the control instruction that cannot be obtained and the state data that cannot be transmitted do not affect the first control system 12 for the basic driving control of the two-wheeled vehicle. In addition, when not operating normally, the basic network interconnection of the second control system 11 is not affected, and the second control system 11 cannot obtain the real time operation state of the two-wheeled vehicle from the first control system 12 or transmit additional external control instructions to the first control system 12.

When both the first control system 12 and the second control system 11 are operating normally, the data can be exchanged in real time. In order to achieve the functions of the smart application based on remote control, the first control system 12 and the second control system 11 need to exchange data. The first control system 12 may also be referred to as a bottom-layer control system, and its basic functions refer to control functions of the existing two-wheeled vehicle, including monitoring the operation state of the two-wheeled vehicle in real time and controlling the operation of the two-wheeled vehicle, and the first control system 12 may accept a control instruction from the second control system 11 to implement the functions of the intelligent application. The second control system 11, referred to as the top-layer control system, is mainly used to access a network of connected vehicles for data exchange, and is also used to implement direct information exchange (including controlling the display device to display the operation state of the two-wheeled vehicle, information exchange with the smart helmet, etc.) between the locomotive terminal and the user.

Specifically, the first control system 12 monitors the steering state, including operations such as left turn, right turn, reverse or U-turn, of the two-wheeled vehicle in real time, and generates early-warning state data according to the steering state data, and needs to transmit at least part of the steering state data and the early-warning state data of the two-wheeled vehicle to the second control system 11 in real time. The first control system 12 may also control the operation of the related components of the two-wheeled vehicle according to the control instruction received from the second control system 11 and an internal preset instruction. Here, the related components may be hardware devices related to the driving of the two-wheeled vehicle, such as battery systems, sensor systems, lighting systems, motors, etc. In addition, the second control system 11 receives the steering state data and the early-warning state data transmitted by the first control system 12, and generates early-warning information based on the early-warning state data, and controls a display of the display apparatus based on the steering state data and/or the early-warning information. The second control system 11 can transmit at least part of the data to the cloud server or the helmet 30, and receive a control instruction from the cloud server 80, and transmit the control instruction for controlling the operation of the two-wheeled vehicle to the first control system 12. The helmet 30 will display the received steering state data and/or the early-warning information to the user in the form of voice and/or image, for outputting an alarm to the user.

The early-warning state data here is determined based on the steering state of the two-wheeled vehicle. For example, if the two-wheeled vehicle needs to turn left at an intersection, because the user wears a helmet with a narrow field of view, the user cannot see the right rear driving environment when steering. The early-warning state data is whether there is an oncoming vehicle to the right rear of the two-wheeled vehicle, the speed and distance values of the oncoming vehicle, whether a collision will occur, etc. If the two-wheeled vehicle turns right, the early-warning state data is whether there is an oncoming vehicle to the left rear of the two-wheeled vehicle, the speed and distance values of the oncoming vehicle, whether a collision will occur, etc. If the two-wheeled vehicle reverses, the early-warning state data is whether there is an oncoming vehicle to the rear of the two-wheeled vehicle, the speed and distance values of the oncoming vehicle, the reversing limit distance, etc. The early-warning information is used to prompt the user to pay attention to the oncoming vehicle to the rear, and danger, etc., and to provide reference suggestions for the user.

In the present application, the specific data or control instructions to be exchanged between the first control system 12 and the second control system 11, and between the second control system 11 and the cloud server can be designed differently depending on the specific type, application function, application environment of the two-wheeled vehicle, etc., but should not be used as a limitation on the present application.

Figure 3:
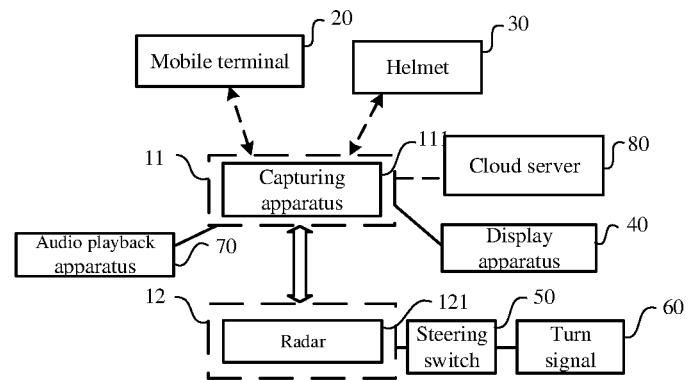
FIG. 3 is a structural block diagram of an early-warning system for steering of a two-wheeled vehicle according to an embodiment of the present application.

FIG. 3 is a structural block diagram of an early-warning system for steering of a two-wheeled vehicle according to an embodiment of the present application.

Specifically, as shown in FIG. 3, a first control system 12 of the two-wheeled vehicle 10 is connected to a steering switch 50, and when a user drives the two-wheeled vehicle about to steer, a turn signal 60 is usually turned on in advance, in which the user actually turns on the steering switch 50. After the steering switch 50 is turned on, the first control system 12 controls the turn signal 60 to light up to alarm the oncoming vehicle from behind.

The second control system 11 of the two-wheeled vehicle 10 includes a capturing apparatus 111 mainly configured to acquire image information behind the two-wheeled vehicle. Specifically, the capturing apparatus 111 can be a camera that takes pictures at regular intervals or a video camera. The capturing apparatus 111 is configured to be various camera modules on exterior of the two-wheeled vehicle to capture images and videos. For example, the capturing apparatus 111 is positioned toward the rear of the two-wheeled vehicle to capture images and video within a preset distance to the rear of the two-wheeled vehicle. In various embodiments, the rearview mirror may be omitted due to the presence of the capturing apparatus 111. In addition, in a preferred embodiment, the capturing apparatus 111 may also be provided on both sides, i.e., a left side camera and a right side camera, of the two-wheeled vehicle due to the narrow field of view of the user wearing a helmet. The left side camera captures images and videos within a preset distance to the left side of the two-wheeled vehicle and may be located below the left rearview mirror. In various embodiments, the left rearview mirror may be omitted and the left side camera may be located near a location where the left side mirror would normally be positioned. The right side camera may capture images and videos within a preset distance to the right side of the two-wheeled vehicle and may be located below the right rearview mirror. In various embodiments, the right rearview mirror may be omitted, and the right side camera may be located near where the right rearview mirror would normally be positioned. The second control system 11 transmits the image and video information acquired by the capturing apparatus 111 to a display apparatus 40 for display. The display apparatus 40 may be a touchscreen display in various embodiments and provided on the two-wheeled vehicle. The user can see on the display apparatus 40 the image and video information behind the two-wheeled vehicle acquired by the capturing apparatus 111, and determine an appropriate steering chance according to the acquired image and video information, to improve driving safety.

The first control system 12 of the two-wheeled vehicle 10 includes a radar 121, which may be one or more of millimeter wave radar, ultrasonic radar, etc., for acquiring radar wave signals behind the two-wheeled vehicle. The two-wheeled vehicle may include one or more radars 121, which transmit radar signals within a preset field of view and identify objects in a preset field of view based on signals reflected from objects in a right preset field of view. For example, an area behind the user is typically a blind area when the user is driving, and the radar 121 transmits radar signals to the rear and identifies objects (e.g., cyclists, two-wheeled vehicles, pedestrians, etc.) within a preset field of view on the rear blind area based on signals reflected from objects within the preset field of view on the rear blind area.

After the radar wave signal is acquired by the radar 121 of the first control system 12, the early-warning state data is generated according to the radar wave signal acquired by the radar 121, such as calculating the operation state of the vehicle (straight ahead, turning, the speed of the vehicle or stop) according to the radar wave signal reflected from the stationary object behind, whether there is an oncoming vehicle behind, calculating a speed of the oncoming vehicle according to the displacement change of the oncoming vehicle within a preset time, the distance to the vehicle, distance change rate and other data. These early-warning state data are transmitted to the second control system 11. The second control system 11 determines whether to generate early-warning information and the content of the early-warning information according to the received early-warning state data.

There are various situations. For example, when the radar detects that there are no pedestrians and vehicles in the preset field of view behind, i.e., no risk is detected or the risk has not yet occurred, the first control system 12 transmits a corresponding warning state data to the second control system 11, and the second control system 11 does not generate the early-warning information, but only converts the early-warning state data transmitted by the first control system 12 into visual information and transmits the visual information to the display apparatus 40 for display. The user only need to check on the display apparatus 40 the image and video and visual warning state data to understand the oncoming vehicle behind, to make the first level of judgment. If the radar detects a risk, such as a pedestrian or a vehicle approaching from behind, the speed of the vehicle behind is 60 km/h, and the two-wheeled vehicle is about to reach the turning area, the speed of the two-wheeled vehicle is only 20 km/h. After a number of seconds of continuous driving in such a state, a distance from the vehicle to the oncoming vehicle becomes 0, a collision will occur. The first control system 12 will generate the corresponding early-warning state data according to the radar wave signal fed back from the radar 121 and transmit the corresponding early-warning state data to the second control system 11. The second control system 11 identifies the risk from the received early-warning state data, and will generate the corresponding early-warning information to inform the user in the forms of the audio warning, the text warning, the image warning, etc.

In a preferred embodiment, the user can set the early-warning level in advance, for example, how many seconds a rear object will collide with the vehicle is determined according to current situations. Different early-warning levels are set depending on the seconds. The shorter the time, the higher the early-warning level. The early-warning levels are divided into a high early-warning level, a medium early-warning level and a low early-warning level. The early-warning levels can be set intelligently by the second control system 11. The second control system 11 sets and uses the early-warning levels by downloading best recommended early-warning levels of historical users from the cloud server 80. The early-warning levels can be set with other parameters, which are not limited here. After the second control system 11 sets the early-warning levels, when receiving the early-warning state information transmitted by the first control system 12, the second control system 11 compares the parameters in the early-warning state information with the parameters corresponding to each of the early-warning levels, and then determines which early-warning level the early-warning state information belongs to, and informs the user of the early-warning information, which is corresponding to the early-warning level that the early-warning state information belongs to, by different ways.

For example, when it is determined that it is a low early-warning level, the early-warning information, such as "Watch out for oncoming vehicles/pedestrians from behind, a collision will occur in * seconds", generated by the second control system 11 is played by voice through the audio playback apparatus 70. The content of the voice playback is displayed on the display apparatus 40. If the user is wearing a helmet, the second control system 11 transmits the generated early-warning information to the helmet. The helmet plays an voice early-warning information played by the audio playback apparatus 70**, and in the helmet the head up display (HUD) of the helmet projects the risk signals to give an alarm, and does not affect the front sight line. The lights on an edge of the helmet flash to remind the user of the existence of risk behind, and to also remind the vehicles behind.

The early-warning system also includes a storage apparatus storing early-warning information corresponding to each of the early-warning levels. The early-warning information includes early-warning information, text early-warning information, image early-warning information, etc. In the case of the second control system 11 to determine the current early-warning level, the second control system 11 calls the corresponding early-warning information from the storage apparatus to display or transmit the early-warning information to the helmet.

Figure 4:
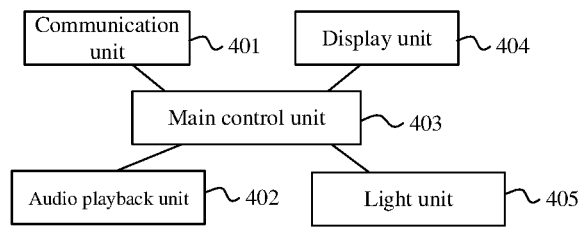
FIG. 4 is a structural block diagram of a helmet module according to an embodiment of the present application.

FIG. 4 is a structural block diagram of a helmet module according to an embodiment of the present application.

The helmet 30 in the embodiment can be a smart helmet, with an overall structure as shown in the smart helmet 30 in FIG. 1, including a shell and an early-warning apparatus provided in the shell. As shown in FIG. 4, the early-warning apparatus includes: a main control unit 403, a communication unit 401, an audio playback unit 402, a display unit 404 and a light unit 405. The communication unit 401 is used to communicate with the two-wheeled vehicle 10, and may also communicate with the cloud server 80 to receive the early-warning information transmitted by the two-wheeled vehicle 10 and transmit it to the main control unit 403. The main control unit 403, after receiving the early-warning information, controls the display unit 404 to display the early-warning information. The display unit 404 can be a HUD device, which can project images or video early-warning information in the helmet located within the sight line of the user. The main control unit 403 also controls the audio playback unit 402 to play voice early-warning information, and the main control unit 403 also controls the light unit 405 on the edge of the helmet to operate, and the light unit 405 flashes to give a warning signal.

In a preferred embodiment, the light unit 405 includes a plurality of lights, all the lights are divided into at least two colors, and each of the at least two colors corresponds to an early-warning level. After the helmet 30 receives the early-warning information transmitted by the second control system 11 of the two-wheeled vehicle 10, the main control unit 403 controls the lights of the corresponding color of the light unit 405 to flash according to the level of the early-warning information transmitted. For example, if it is a low early-warning level, the green light is controlled to flash; if it is a medium early-warning level, the blue light is controlled to flash; if it is a high early-warning level, the red light is controlled to flash. In addition, the flashing frequency of the light can be set. For example, when it is a low early-warning level, the light flashing frequency is lower; when it is a medium early-warning level, the light flashing frequency is regular; when it is a high early-warning level, the light flashing frequency is higher. Users can quickly determine the early-warning level according to the flashing color or the flashing frequency, and determine the degree of risk, to make a reasonable response, fast and efficient elimination of risk, to ensure driving safety.

It should be noted that the smart helmet described in this embodiment is an example implementation of the present application, and any helmet that can communicate with the two-wheeled vehicle and display or play information can be applied to the present application. In other words, each of the function modules of the above-mentioned smart helmet can be added or deleted according to different purposes.

The interaction between the two-wheeled vehicle and the intelligent helmet makes the function of the early-warning system for steering of the present application more diversified and convenient, improves the user's feeling of intelligent, remote control even more, enhances the user experience, and improves the quality of people's lives.

Figure 5:
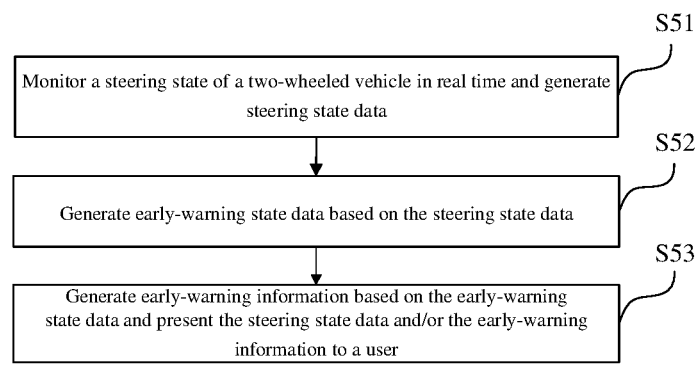
FIG. 5 is a flowchart of an early-warning method for steering of a two-wheeled vehicle according to an embodiment of the present application.

FIG. 5 is a flowchart of an early-warning method for steering of a two-wheeled vehicle according to an embodiment of the present application. As shown in FIG. 5, the method includes the following steps.

S51: Monitor a steering state of the two-wheeled vehicle in real time and generate steering state data.

Specifically, the first control system 12 monitors the steering state, including operations such as left turn, right turn, reverse or U-turn, of the two-wheeled vehicle in real time, and transmits at least part of the steering state data of the two-wheeled vehicle to the second control system 11 in real time. The first control system 12 may also control the operation of the related components of the two-wheeled vehicle according to internal preset instructions and control instructions received from the second control system 11. Here, the related components may be hardware devices related to the driving of the two-wheeled vehicle, such as battery systems, sensor systems, lighting systems, motors, etc. In addition, the second control system 11 receives steering state data and early-warning state data transmitted by the first control system 12, and generates early-warning information according to the early-warning state data, and controls a display of the display apparatus according to the steering state data and/or the early-warning information. The second control system 11 can transmit at least part of the data to the cloud server or the helmet 30, and receive control instructions from the cloud server 80, and transmit the control instructions for controlling the operation of the two-wheeled vehicle to the first control system 12. The helmet 30 will display the received steering state data and/or the early-warning information to the user in the form of voice and/or image, for outputting an alarm to the user.

S52: Generate early-warning state data based on the steering state data.

Specifically, the second control system 11 of the two-wheeled vehicle 10 includes a capturing apparatus 111 mainly configured to acquire image information behind the two-wheeled vehicle. Specifically, the capturing apparatus 111 can be a camera that takes pictures at regular intervals or a video camera. The capturing apparatus 111 is configured to be various camera modules on exterior of the two-wheeled vehicle to capture images and videos. For example, the capturing apparatus 111 is positioned toward the rear of the two-wheeled vehicle to capture images and video within a preset distance to the rear of the two-wheeled vehicle. In various embodiments, the rearview mirror may be omitted due to the presence of the capturing apparatus 111. In addition, in a preferred embodiment, the capturing apparatus 111 may also be provided on both sides, i.e., a left side camera and a right side camera, of the two-wheeled vehicle due to the narrow field of view of the user wearing a helmet. The left side camera captures images and videos within a preset distance to the left side of the two-wheeled vehicle and may be located below the left rearview mirror. In various embodiments, the left rearview mirror may be omitted and the left side camera may be located near a location where the left side mirror would normally be positioned. The right side camera may capture images and videos within a preset distance to the right side of the two-wheeled vehicle and may be located below the right rearview mirror. In various embodiments, the right rearview mirror may be omitted, and the right side camera may be located near where the right rearview mirror would normally be positioned. The second control system 11 transmits the image and video information acquired by the capturing apparatus 111 to the display apparatus 40 for display. The display apparatus 40 may be a touchscreen display in various embodiments and provided on the two-wheeled vehicle. The user can see on the display apparatus 40 the image and video information behind the two-wheeled vehicle acquired by the capturing apparatus 111, and determine an appropriate steering chance according to the acquired image and video information, to improve driving safety.

The first control system 12 of the two-wheeled vehicle 10 includes a radar 121, which may be one or more of millimeter wave radar, ultrasonic radar, etc., for acquiring radar wave signals behind the two-wheeled vehicle. The two-wheeled vehicle may include one or more radars 121, which transmit radar signals within a preset field of view and identify objects in a preset field of view based on signals reflected from objects in a right preset field of view. For example, an area behind the user is typically a blind area when the user is driving, and the radar 121 transmits radar signals to the rear and identifies objects (e.g., cyclists, two-wheeled vehicles, pedestrians, etc.) within preset field of view on the rear blind area based on signals reflected from objects within the preset field of view on the rear blind area.

S53: Generate early-warning information based on the early-warning state data, and display the steering state data and/or the early-warning information to the user.

Specifically, after the radar wave signal is acquired by the radar 121 of the first control system 12, the early-warning state data is generated according to the radar wave signal acquired by the radar 121, such as calculating the operation state of the vehicle (straight ahead, turning, the speed of the vehicle or stop) according to the radar wave signal reflected from the stationary object behind, whether there is an oncoming vehicle behind, calculating a speed of the oncoming vehicle according to the displacement change of the oncoming vehicle within a preset time, the distance to the vehicle, distance change rate and other data. These early-warning state data are transmitted to the second control system 11. The second control system 11 determines whether to generate early-warning information and the content of the early-warning information according to the received early-warning state data.

There are various situations. For example, when the radar detects that there are no pedestrians and vehicles in the preset field of view behind, i.e., no risk is detected or the risk has not yet occurred, the first control system 12 transmits a corresponding warning state data to the second control system 11, and the second control system 11 does not generate the early-warning information, but only converts the early-warning state data transmitted by the first control system 12 into visual information and transmits the visual information to the display apparatus 40 for display. The user only need to check on the display apparatus 40 the image and video and visual warning state data to understand the oncoming vehicle behind, to make the first level of judgment. If the radar detects a risk, such as a pedestrian or vehicle approaching from behind, the speed of the vehicle behind is 60 km/h, and the two-wheeled vehicle is about to reach the turning area, the speed of the two-wheeled vehicle is only 20 km/h. After a number of seconds of continuous driving in such a state, a distance from the vehicle to the oncoming vehicle becomes 0, a collision will occur. The first control system 12 will generate the corresponding early-warning state data according to the radar wave signal fed back from the radar 121 and transmit the corresponding early-warning state data to the second control system 11. The second control system 11 identifies the risk from the received early-warning state data, and will generate the corresponding early-warning information to inform the user in the forms of the audio warning, the text warning, the image warning, etc.

In a preferred embodiment, the user can set the early-warning level in advance, for example, how many seconds a rear object will collide with the vehicle is determined according to current situations. Different early-warning levels are set depending on the seconds. The shorter the time, the higher the early-warning level. The early-warning levels are divided into a high early-warning level, a medium early-warning level and a low early-warning level. The early-warning levels can be set intelligently by the second control system 11. The second control system 11 sets and uses the early-warning levels by downloading best recommended early-warning levels of historical users from the cloud server 80. The early-warning levels can be set with other parameters, which are not limited here. After the second control system 11 sets the early-warning levels, when receiving the early-warning state information transmitted by the first control system 12, the second control system 11 compares the parameters in the early-warning state information with the parameters corresponding to each of the early-warning levels, and then determines which early-warning level the early-warning state information belongs to, and informs the user of the early-warning information, which is corresponding to the early-warning level that the early-warning state information belongs to, by different ways.

For example, when it is determined that it is a low early-warning level, the early-warning information, such as "Watch out for oncoming vehicles/pedestrians from behind, a collision will occur in * seconds", generated by the second control system 11 is played by voice through the audio playback apparatus 70. The content of the voice playback is displayed on the display apparatus 40. If the user is wearing a helmet, the second control system 11 transmits the generated early-warning information to the helmet. The helmet plays an voice early-warning information played by the audio playback apparatus 70**, and in the helmet the head up display (HUD) of the helmet projects the risk signals to give an alarm, and does not affect the front sight line. The lights on the edge of the helmet flash to remind the user of the existence of risk behind, and to also remind the vehicles behind.

Figure 6:
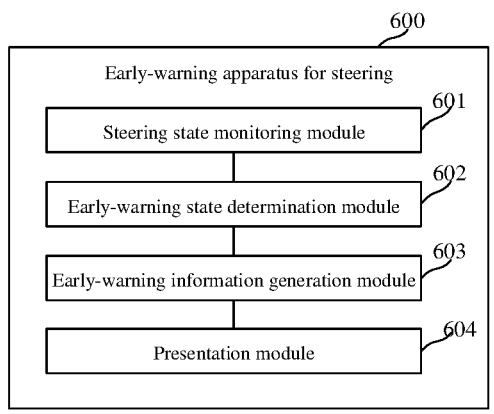
FIG. 6 is a schematic diagram of an early-warning apparatus for steering of a two-wheeled vehicle according to an embodiment of the present application.

FIG. 6 is a schematic diagram of an early-warning apparatus for steering of a two-wheeled vehicle according to an embodiment of the present application.

As shown in FIG. 6, the apparatus 600 includes:
a steering state monitoring module 601 configured to monitor a steering state of the two-wheeled vehicle in real time and generate steering state data. Specifically, the steering state monitoring module 601 monitors the steering state of the two-wheeled vehicle in real time. The steering state here includes operations such as left turn, right turn, reverse or U-turn, etc. The steering state monitoring module 601 transmits at least part of the steering state data of the two-wheeled vehicle to an early-warning state determination module 602 in real time. The steering state monitoring module 601 includes a control unit for, when the user turns on a steering switch on the two-wheeled vehicle, monitoring the steering state of the two-wheeled vehicle in real time to generate a steering instruction, and for turning on the turn signals on the two-wheeled vehicle according to the steering instruction.

The early-warning state determination module 602 is configured to generate early-warning state data according to the steering state data.

Specifically, the early-warning state determination module 602 includes:
an image acquisition unit for acquiring image information within a set range behind the two-wheeled vehicle. The image acquisition unit may control a capturing apparatus provided on the two-wheeled vehicle to acquire image information surrounding the two-wheeled vehicle. The capturing apparatus can be a camera that takes pictures at regular intervals or a video camera. The capturing apparatus is configured to be various camera modules on exterior of the two-wheeled vehicle to capture images and videos. For example, the capturing apparatus is positioned toward the rear of the two-wheeled vehicle to capture images and video within a preset distance to the rear of the two-wheeled vehicle. In various embodiments, the rearview mirror may be omitted due to the presence of the capturing apparatus. In addition, in a preferred embodiment, the capturing apparatus may also be provided on both sides, i.e., a left side camera and a right side camera, of the two-wheeled vehicle due to the narrow field of view of the user wearing a helmet. The left side camera captures images and videos within a preset distance to the left side of the two-wheeled vehicle and may be located below the left rearview mirror. In various embodiments, the left rearview mirror may be omitted and the left side camera may be located near a location where the left side mirror would normally be positioned. The right side camera may capture images and videos within a preset distance to the right side of the two-wheeled vehicle and may be located below the right rearview mirror. In various embodiments, the right rearview mirror may be omitted, and the right side camera may be located near where the right rearview mirror would normally be positioned. The user sees the image and video information behind the two-wheeled vehicle acquired by the camera unit and determines an appropriate steering chance according to the acquired image and video information, to improve driving safety.

The radar unit is configured to acquire radar wave signals behind the two-wheeled vehicle. The radar unit may control an ultrasonic radar or millimeter wave radar on the two-wheeled vehicle to acquire radar wave signals behind the two-wheeled vehicle, and the two-wheeled vehicle may include one or more radars. The radar transmits radar signals within a preset field of view and identifies objects within the preset field of view according to signals reflected back from objects within the right preset field of view. For example, an area behind a user is typically a blind area during driving. The radar transmits radar signals to the rear and identifies objects within the preset field of view on the rear blind area (e.g., cyclists, two-wheeled vehicles, pedestrians, etc.) according to signals reflected back by objects within the preset field of view one the rear blind area.

After the radar wave signal is acquired, the early-warning state data is generated according to the radar wave signal acquired by the radar, such as calculating the operation state of the vehicle (straight ahead, turning, the speed of the vehicle or stop) according to the radar wave signal reflected from the stationary object behind, whether there is an oncoming vehicle behind, calculating a speed of the oncoming vehicle according to the displacement change of the oncoming vehicle within a preset time, the distance to the vehicle, distance change rate and other data. These early-warning state data are transmitted to the second control system 11.

An early-warning information generation module 603 is configured to generate early-warning information according to the early-warning state data.

Specifically, the early-warning information generation module 603 determines whether to generate the early-warning information and the content of the early-warning information according to the early-warning state data. There are various situations. For example, when the radar unit detects that there are no pedestrians and vehicles in the preset field of view behind, i.e., no risk is detected or the risk has not yet occurred, the early-warning state determination module 602 transmits the corresponding warning state data to the early-warning information generation module 603. The early-warning information generation module 603 does not generate early-warning information, but only converts the early-warning state data transmitted by the early-warning state determination module 602 into visual information for display. The user only needs to check the displayed images and videos and visual early-warning state data to understand the oncoming vehicle behind, to make the first layer of judgment. If the radar unit detects a risk, such as a pedestrian or a vehicle approaching from behind, a speed of the vehicle behind is 60 km/h, and the vehicle is about to reach the turning area, the speed is only 20 km/h. After a number of seconds of continuous driving in such a state, if a distance from the vehicle to the oncoming vehicle is 0, that is, a collision will occur, the early-warning state determination module 602 will generate the corresponding warning state data according to the radar wave signal fed back from the radar unit and transmit it to the early-warning information generation module 603, and the early-warning information generation module 603 identifies the risk through the received early-warning state data, and will generate corresponding early-warning information to inform the user in the forms of audio warning, text warning, image warning, etc.

In a preferred embodiment, the user can set the early-warning level in advance, for example, how many seconds a rear object will collide with the vehicle is determined according to current situations. Different early-warning levels are set depending on the seconds. The shorter the time, the higher the early-warning level. The early-warning levels are divided into a high early-warning level, a medium early-warning level and a low early-warning level. The early-warning levels can be set intelligently by the early-warning information generation module 603. The early-warning information generation module 603 sets and uses the early-warning levels by downloading best recommended early-warning levels of historical users from the cloud server. The early-warning levels can be set with other parameters, which are not limited here. After the early-warning information generation module 603 sets the early-warning levels, when receiving the early-warning state information transmitted by early-warning state determination module 602, the early-warning information generation module 603 compares the parameters in the early-warning state information with the parameters corresponding to each of the early-warning levels, and then determines which early-warning level the early-warning state information belongs to, and informs the user of the early-warning information, which is corresponding to the early-warning level that the early-warning state information belongs to, by different ways.

A presentation module 604 is configured to present the steering state data and/or early-warning information to the user.

Specifically, for example, when it is determined that it is a low early-warning level, the early-warning information, such as "Watch out for oncoming vehicles/pedestrians from behind, a collision will occur in *** seconds", generated by the early-warning information generation module 603 is played by voice through the audio playback unit. The content of the voice playback is displayed on a text display unit. If the user is wearing a helmet, the early-warning information generation module 603 transmits the generated early-warning information to the helmet. The helmet plays an voice early-warning information played by the audio playback unit, and in the helmet the head up display (HUD) of the helmet projects the risk signals to give an alarm, and does not affect the front sight line. The lights on the edge of the helmet flash, to remind the user of the existence of risk behind, and to also remind the vehicles behind.

In addition, an embodiment of the present application further discloses a two-wheeled vehicle 10 as shown in FIG. 1, including a vehicle body and an early-warning system for steering in the above embodiment, the vehicle body including a display apparatus, wheels, handles, etc., the early-warning system for steering including a first control system and a second control system both operating independently and capable of exchanging data in real time.

The first control system is configured to: monitor a steering state of the two-wheeled vehicle in real time and generate steering state data; generate early-warning state data based on the steering state data; transmit at least part of the steering state data and the early-warning state data to the second control system in real time; and control corresponding components of the two-wheeled vehicle to operate according to preset instructions inside the first control system and control instructions from the second control system; a second control system is configured to: receive steering state data and early-warning state data transmitted by the first control system; generate early-warning information based on the early-warning state data, and control the display apparatus to display based on the steering state data and/or the early-warning information.

Figure 7:
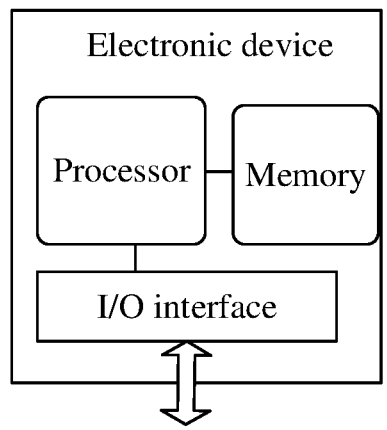
FIG. 7 is a schematic structural diagram of an electronic device according to an embodiment of the present application.

FIG. 7 is a schematic structural diagram of an electronic device according to an embodiment of the present application, the electronic device including a processor and a memory storing a computer executable program, the processor executes an early-warning method for steering when the computer program is executed by the processor.

The electronic device is represented by a general-purpose computing device as shown in FIG. 7. The processor may be one or more and operate in concert. The present application does not exclude performing distributed processing either, i.e., the processors may be distributed among different physical devices. The electronic device of the present application is not limited to a single entity, but can also be the sum of several physical devices.

The memory stores a computer-readable program, usually being machine-readable codes. The computer-readable program may be executed by the processor to enable the electronic device to perform the method of the present application, or at least some of the steps in the method.

The memory includes volatile memory, such as random access memory units (RAM) and/or cache memory units, and may also be non-volatile memory, such as read-only memory units (ROM).

Optionally, the electronic device in the embodiment further includes an I/O interface for data exchange between the electronic device and external devices. The I/O interface may be one or more of several types of bus structures, including a memory cell bus or memory cell controller, a peripheral bus, a graphics acceleration port, a processing unit, or a local bus using any of the multiple bus structures.

It should be understood that the electronic device shown in FIG. 7 is only an example of the present application, and that the electronic device of the present application may also include elements or components not shown in the above examples. For example, some electronic devices also include display units such as displays, and some electronic devices also include human-computer interaction elements such as pushbuttons, keyboards, etc. As long as the electronic device is capable of executing a computer-readable program in the memory to implement the method or at least some steps of the method of the present application, it may be considered that an electronic device is covered by the present application.

By the above description of the embodiments, it is readily understood by those skilled in the art that the present application may be implemented by hardware capable of executing a particular computer program, such as the system of the present application, and an electronic processing unit, a server, a client, a phone, a control unit, a processor, etc. contained in the system. The present application may also be implemented by a two-wheeled vehicle containing at least a portion of the above system or components. The present application can also be implemented by computer software executing the method of the present application, such as control software executed by microprocessors, electronic control units, clients, servers, etc. at the locomotive side. However, it should be noted that the computer software for executing the method of the present application is not limited to being executed by one or a specific number of hardware entities, but can also be implemented by non-specific hardware in a distributed manner, for example, some of the method steps of the computer program execution can be executed on the locomotive side and another part can be executed in a mobile terminal or smart helmet, etc. For computer software, the software product can be stored in a computer-readable storage medium (which can be a CD-ROM, a USB flash drive, a removable hard disk, etc.) or can be stored in a distributed manner on a network, as long as it enables the electronic device to execute the method according to the present application.

Figure 8:
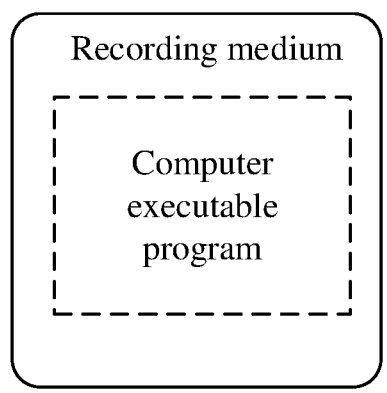
FIG. 8 is a schematic diagram of a computer-readable recording medium according to an embodiment of the present application.

FIG. 8 is a schematic diagram of a computer-readable recording medium according to an embodiment of the present application. As shown in FIG. 8, a computer-executable program is stored on a computer-readable recording medium, and the computer-executable program, when executed, implements the early-warning method for steering described above in the present application. The computer-readable storage medium may include a data signal propagated in the baseband or as part of a carrier wave and carrying the readable program code. Such propagated data signals may take a variety of forms, including but not limited to electromagnetic signals, optical signals, or any suitable combination of the foregoing. The readable storage medium may also be any readable medium other than a readable storage medium that transmits, propagates, or transmits a program for use by or in conjunction with an instruction execution system, a device, or a component. The program code contained on the readable storage medium may be transmitted using any suitable medium, including but not limited to wireless, wired, optical, RF, etc., or any suitable combination of the foregoing.

The program code for performing the operations of the present application may be written in any combination of one or more programming languages, the programming languages includes object-oriented programming languages—such as Java, C++, etc., and also includes conventional procedural programming languages—such as "C" language or similar programming languages. The program code may be executed entirely on the user computing device, partially on the user device, as a stand-alone package, partially on the user computing device and partially on the remote computing device, or entirely on the remote computing device or server. In a case of involving a remote computing device, the remote computing device may be connected to the user computing device via any kind of network, including a local area network (LAN) or a wide area network (WAN), or may be connected to an external computing device (e.g., using an Internet service provider to connect via the Internet).

The specific embodiments described above provide a further detailed description of the purpose, technical solutions and beneficial effects of the present application, and it should be understood that the above described are only specific embodiments of the present application and are not intended to limit the present application, and that any modifications, equivalent replacements, improvements, etc. made within the spirit and principles of the present application shall be included within the claimed scope of the present application.

The invention claimed is:

1. An early-warning system applied to a two-wheeled vehicle comprising a display apparatus, wherein the early-warning system comprises:
a helmet;
a first control system configured to:
detect, in real time, a steering state of the two-wheeled vehicle;
generate steering state data;
generate early-warning state data based on the steering state data; and
control corresponding components of the two-wheeled vehicle to operate according to both control instructions and internal preset instructions; and
a second control system, wherein both the first control system and the second control system are configured to operate independently and exchange data in real time, the first control system and the second control system both constitute a dual independent control system configured so that normal operations of basic operation modes of the first control system are independent of normal operations of the second control system, and the second control system is configured to:
receive, in real time, steering state data and early-warning state data transmitted by the first control system;
generate early-warning information based on the early-warning state data;
send the control instructions to the first control system;
control a display of the display apparatus based on the steering state data and the early-warning information; and
transmit the early-warning information to the helmet connected to the two-wheeled vehicle; and the helmet is configured to play the early-warning information to a user as voice early-warning information to the user.

2. The early-warning system of claim 1, wherein the second control system is further configured to transmit at least one of the steering state data, the early-warning state data, and the early-warning information to a cloud server connected to the second control system.

3. The early-warning system of claim 1, wherein the first control system is connected to a steering switch and a turn signal provided on the two-wheeled vehicle, and configured to control the turn signal to light up when a user turns on the steering switch.

4. The early-warning system of claim 1, wherein the second control system further comprises:
a capturing apparatus configured to:
acquire image information behind the two-wheeled vehicle; and
transmit the image information to the display apparatus.

5. The early-warning system of claim 1, wherein the first control system further comprises:
a radar configured to:
acquire radar wave signals in a blind area behind the two-wheeled vehicle; and
generate the early-warning state data based on the radar wave signals.

6. The early-warning system of claim 5, wherein the early-warning information comprises early-warning levels, and the second control system is further configured to control the display of the display apparatus according to the early-warning levels.

7. The early-warning system of claim 6, wherein the two-wheeled vehicle further comprises:
an audio playback apparatus and the second control system is further configured to:
generate different early-warning audio according to the early-warning levels; and
transmit the early-warning audio to the audio playback apparatus.

8. The early-warning system of claim 1, wherein the helmet further comprises:
at least one of a display unit, an audio playback unit, and a light unit, and is further configured to control the display unit, the audio playback unit, or the light unit to operate based on the early-warning information.

9. The early-warning system of claim 8, wherein the light unit further comprises:
a plurality of lights presenting at least two colors, each color corresponds to a respective early-warning level, and the helmet is further configured to flash a corresponding color according to the early-warning level.

10. The early-warning system of claim 2, wherein the cloud server is further configured to transmit a control instruction from a mobile terminal to the second control system.

11. The early-warning system of claim 2, wherein the cloud server is further configured to transmit best recommended early-warning levels of historical users.

12. The early-warning system of claim 9, wherein the plurality of lights is configured to present three colors that respectively correspond to a low early-warning level, a medium early-warning level, and a high early-warning level.

13. The early-warning system of claim 12, wherein the low early-warning level prompts a green light to flash, the medium early-warning level prompts a blue light to flash, and the high early-warning level prompts a red light to flash.

* * * * *